US011285683B2

(12) United States Patent
Jenter et al.

(10) Patent No.: US 11,285,683 B2
(45) Date of Patent: Mar. 29, 2022

(54) CONTAINER COMPRESSING ARRANGEMENT

(71) Applicant: Tomra Systems ASA, Asker (NO)

(72) Inventors: Holger Jenter, Balingen-Heselwangen (DE); Thomas Völkle, Rosenfeld-Täbingen (DE)

(73) Assignee: TOMRA SYSTEMS ASA, Asker (NO)

( * ) Notice: Subject to any disclaimer, the term of this patent is extended or adjusted under 35 U.S.C. 154(b) by 389 days.

(21) Appl. No.: 16/077,897

(22) PCT Filed: Feb. 17, 2017

(86) PCT No.: PCT/EP2017/053648
§ 371 (c)(1),
(2) Date: Aug. 14, 2018

(87) PCT Pub. No.: WO2017/140863
PCT Pub. Date: Aug. 24, 2017

(65) Prior Publication Data
US 2019/0030848 A1 Jan. 31, 2019

(30) Foreign Application Priority Data

Feb. 17, 2016 (EP) ..................................... 16156129

(51) Int. Cl.
*B30B 9/32* (2006.01)
*G07F 7/06* (2006.01)
*B30B 3/00* (2006.01)

(52) U.S. Cl.
CPC .............. *B30B 9/325* (2013.01); *B30B 3/005* (2013.01); *G07F 7/0609* (2013.01); *Y02W 30/62* (2015.05)

(58) Field of Classification Search
CPC ........... B30B 3/005; B30B 3/04; B30B 9/325; B30B 9/321; B02C 4/30; B02C 4/08; D01B 1/22; G07F 7/0609
See application file for complete search history.

(56) References Cited

U.S. PATENT DOCUMENTS 2,844,184 A 7/1958 Vollmer
3,614,821 A * 10/1971 Qualheim ............... B30B 9/325
241/293

(Continued)

FOREIGN PATENT DOCUMENTS

DE 39 22 615 A1 9/1990
DE 202008012248 U1 1/2009

(Continued)

OTHER PUBLICATIONS

Machine Translation of JP 2003-136292, 4 Pages. (Year: 2003).*

(Continued)

*Primary Examiner* — Gregory D Swiatocha
(74) *Attorney, Agent, or Firm* — Buchanan Ingersoll & Rooney P.C.

(57) ABSTRACT

Container compressing arrangement, mountable in a reverse vending machine, for compacting empty containers, in particular beverage bottles or cans which are preferably made of plastic or metallic material, such as PET or tinned metal, the container compressing arrangement including: a first and a second rotatable roller, each of the rollers having a working surface arranged between two oppositely arranged ends, wherein the rollers are arranged adjacent to each other to rotate in opposite directions around a respective rotation axis in a common geometrical xz-plane; and wherein the working surface includes a plurality of ridges extending across the working surface, in an axial direction of the roller, and distributed in the circumferential direction of the work- (Continued)

ing surface, each ridge having a longitudinal extension in the axial direction.

25 Claims, 8 Drawing Sheets

(56) References Cited

U.S. PATENT DOCUMENTS

| | | | | | |
|---|---|---|---|---|---|
| 4,401,279 | A | * | 8/1983 | DeVita | B02C 18/142 |
| | | | | | 241/236 |
| 4,690,340 | A | * | 9/1987 | Hatanaka | B02C 18/0007 |
| | | | | | 241/236 |
| 5,025,995 | A | * | 6/1991 | Smith | B02C 19/0081 |
| | | | | | 100/902 |
| 5,257,741 | A | * | 11/1993 | Rode | B02C 19/0081 |
| | | | | | 241/100 |
| 5,511,729 | A | * | 4/1996 | Husain | B02C 18/182 |
| | | | | | 241/46.01 |
| 5,560,552 | A | * | 10/1996 | Powell | B02C 18/142 |
| | | | | | 241/100 |
| 6,036,591 | A | * | 3/2000 | Bonon | A22C 9/004 |
| | | | | | 452/142 |
| 6,036,818 | A | * | 3/2000 | Odmark | B30B 9/20 |
| | | | | | 162/261 |
| 7,159,809 | B1 | * | 1/2007 | Cheng | B02C 4/08 |
| | | | | | 241/101.2 |
| 7,540,235 | B2 | * | 6/2009 | Schwelling | B02C 18/142 |
| | | | | | 100/174 |
| 2012/0260811 | A1 | * | 10/2012 | Schulenberg | B30B 9/325 |
| | | | | | 100/176 |
| 2014/0196616 | A1 | | 7/2014 | Schwelling | |
| 2015/0298415 | A1 | * | 10/2015 | Schwelling | B30B 3/04 |
| | | | | | 100/176 |
| 2015/0360430 | A1 | * | 12/2015 | Frazier | B30B 9/325 |
| | | | | | 100/39 |
| 2016/0263580 | A1 | * | 9/2016 | Rhea | B02C 4/08 |

FOREIGN PATENT DOCUMENTS

| | | | | |
|---|---|---|---|---|
| EP | 0683020 | A2 * | 11/1995 | ............ F16H 55/18 |
| EP | 1757438 | A1 * | 2/2007 | ............ B30B 9/325 |
| EP | 2174716 | A1 | 4/2010 | |
| GB | 191313817 | A * | 1/1914 | ............ D01B 1/22 |
| JP | S50-75166 | U | 7/1975 | |
| JP | S56-36399 | A | 4/1981 | |
| JP | H04-017834 | U | 2/1992 | |
| JP | H09-122983 | A | 5/1997 | |
| JP | H09206993 | A | 8/1997 | |
| JP | 11285899 | A * | 10/1999 | ............ B30B 9/325 |
| JP | 2001001188 | A | 1/2001 | |
| JP | 2003-136292 | A | 5/2003 | |
| JP | 2003136292 | A * | 5/2003 | ............ B30B 9/325 |
| JP | 3463289 | B2 | 11/2003 | |
| RU | 2016108170 | A | 9/2017 | |
| WO | 2006094819 | A2 | 9/2006 | |

OTHER PUBLICATIONS

Machine Translation of EP 0683020, 8 Pages. (Year: 1995).*
Machine Translation of EP 1757438, 4 Pages (Year: 2007).*
Machine Translation of JP 11-285899, 26 Pages. (Year: 1999).*
Office Action (Examination Report) dated Dec. 1, 2021, by the Intellectual Property India—Government of India in corresponding Indian Patent Application No. 201817031672, with an English Translation. (8 pages).
Office Action dated Feb. 16, 2021, by the Federal Center for Intellectual Property in Russian Patent Application No. a 20180386 and an English Translation of the Office Action. (8 pages).
Office Action (Notice of Reasons for Rejection) dated Jan. 20, 2021, by the Japanese Patent Office in corresponding Japanese Patent Application No. 2018-539904, and an English Translation of the Office Action. (13 pages).
Office Action (Notice of Reasons for Rejection) dated Nov. 1, 2021 by the Japanese Patent Office in corresponding Japanese Patent Application No. 2018-539904, and an English Translation of the Office Action. (9 pages).
Office Action dated Jan. 5, 2022, by the Canadian Intellectual Property Office in Canadian Patent Application No. 3,014,844 (5 pages).

* cited by examiner

CONTAINER COMPRESSING ARRANGEMENT

TECHNICAL FIELD OF THE INVENTION

The present invention relates to a container compressing arrangement mountable in a reverse vending machine, as well as a method for compressing containers in a reverse vending machine.

BACKGROUND

Reverse vending machines are generally arranged so that a person can return empty containers, and in some cases receive some money in return. The reverse vending machine may collect a large number of containers in a short period of time. This means that the reverse vending machine needs to efficiently store the containers so that the storage bin for the containers need not be replaced too frequently. Therefore, the containers are compressed by the reverse vending machine so that they each take up less space than before being compressed.

In order to compress the containers, the reverse vending machines typically have a compressing arrangement with rollers which have two main tasks, grabbing the container and then compressing it between the rollers. Desirably the rollers should compress the containers in such a way that they stay flattened after they are released from the rollers in order to reduce the space needed to store each compressed container. When compressing containers the rollers are subjected to cyclic loads, forces. The loads in turn result in mechanical wear which may results in mechanical and fatigue failure of the rollers. This may be due to the material of the rollers failing, due to being too weak and not suited for use in rollers. The failure may also be due to the design of a roller, leading to elevated local mechanical stresses where fatigue cracks can initiate and propagate until fatigue failure occurs in the roller. Such failures are costly and results in downtime for the reverse vending machine. Hence, there is a desire to reduce the risk for failure as well as increase the mechanical life of the roller arrangement.

One solution to this problem is to replace the material of the rollers to higher strength materials. However, such materials often have a high material cost compared to materials often used for rollers. Using higher strength materials also increase roller manufacturing costs by the increased strength in the materials increasing manufacturing tool wear and manufacturing time.

Hence, there is a desire to improve the state of the art to provide an improved container compressing arrangement reducing mechanical wear and failure.

SUMMARY OF THE INVENTION

In view of the above, it is a general object of the present invention to provide an improved container compressing arrangement mountable in a reverse vending machine which overcomes or at least alleviate the above explained drawbacks.

According to a first aspect of the present invention it is therefore provided a container compressing arrangement, mountable in a reverse vending machine, for compacting empty containers, in particular beverage bottles or cans which are preferably made of plastic or metallic material, such as PET or tinned metal, said container compressing arrangement comprising:

a first and a second rotatable roller, each of said rollers having a working surface arranged between two oppositely arranged ends, wherein said rollers are arranged adjacent to each other to rotate in opposite directions around a respective rotation axis in a common geometrical xz-plane; and wherein said working surface comprises a plurality of ridges extending across said working surface, in an axial direction of said roller, and distributed in the circumferential direction of said working surface, each ridge having a longitudinal extension in said axial direction; and wherein said rollers are adapted to rotate in a meshed and contactless co-operation such that a roller gap is always present between said rollers along a c-c direction between said rotation axes (106, 108).

By "contactless" co-operation there is no direct contact between the two rollers, or interference between the two working surfaces between the co-operating rollers. This reduces the wear of the rollers and as well as the risk for the two rollers to be wedged with resulting breakdown of the driveline of the rollers. Another way to describe the co-operation is in a similar manner as a contactless interaction between a gear and a pinion. The meshed and contactless co-operation assures that there is always a gap, or space, between the rollers. When the container compressing arrangement compresses containers the containers are compressed so that they fill, or at least partly fill, the gap, or space between the two rollers.

By "meshed" co-operation the rollers are arranged to rotate such that in the roller gap, ridges of a first rollers meets with a portion, arranged opposite, on a second roller, the portion being arranged between two adjacent ridges of said second roller. Another way to describe the meshed co-operation is in a similar manner as a contactless interaction between two gears. The meshed and contactless co-operation assures that there is always a gap, or space, between the rollers and that no direct contact between the rollers exists.

The meshed and contactless co-operation of the container compressing arrangement results in a reduced wear on the rollers. Such wear may reduce the performance of a container compressing arrangement as well as increase the risk for container getting stuck in the container compressing arrangement and damaging the rollers or drive system of the rollers. By reducing the wear of the rollers; the life of the rollers, and the roller arrangement, is increased.

Additionally or alternatively the smallest distance between the rollers is said roller gap, said roller gap being in said xy-plane and having a longitudinal extension in said axial direction. The roller gap formed between the two rollers in the xy-plane between the two working surfaces, extend in the longitudinal, or axial direction, of the rollers. The x-axis of the xy-plane is aligned with a centre-to-centre axis, between the respective rotation axes of the rollers of the container compressing arrangement. The xy-plane being a plane the respective rotation axes is perpendicular to. The c-c or centre-to-centre distance, is the distance between the rotation axes of the rollers of the container compressing arrangement.

The rollers are arranged to be rotated in opposite directions, in other words, the rollers are arranged such that they counter-rotate. Furthermore, the rotation of the rollers is such that the rollers grab and force (i.e. push and/or pull) container to in-between the two rollers. The rotational speed of the two rollers is the same if the diameter of the two rollers match. If one roller has a smaller diameter the speed of the two rollers may be different. The rotation axes of the first and second rotatable roller may be parallel. That the rotation axes are arranged parallel does not exclude a small deviation from parallel. For example, an angle between the rotation axes in the interval from 0 to 3 degrees should be interpreted as being included in "parallel". The roller arrangement may be said to be arranged in an orthogonal xyz-co-ordinate system defined by an x-axis, a y-axis, and a z-axis. The rollers may be arranged so that the rotation axes of the two rollers are parallel to the z-axis of the co-ordinate system. The rotation axes may then be said to be in a common geometrical xz-plane. An axial direction may be defined as a direction being parallel to the z-axis, or in the z-direction, of the xyz-co-ordinate system.

The rollers of at least one or both of the rollers comprise a plurality of ridges. The ridges extend across the working surface of a roller, or have a longitudinal extension in the axial direction of the roller. The longitudinal extension of a ridge may be parallel or partly parallel to a respective rotation axis of a roller. The ridges may extend fully or partly across the working surface of a roller. The ridges may be arranged, or distributed, evenly around the circumference of a working surface of a roller. Alternatively, the ridges may be unevenly arranged, or distributed around the circumferential direction of the working surface of a roller.

Further, ridges in the rollers are easy to manufacture by means of grinding. Grinding of the ridges may produce a smoother shape compared to milling. Milling often leaves small steps in the milled surface which require secondary manufacturing to be removed. The ridges may thus be manufactured in fewer manufacturing or production steps as there may be no need for secondary working of the ridges by additional machines for creating the smoother shape of the ridges if the ridges are ground. This reduces the cost and time for manufacturing the ridges as well as the time for manufacturing the rollers which in turn reduces manufacturing costs. Milling of the ridges is of course also possible however it may require advance milling machines or an advanced mounting of the work piece for being manufactured.

The rollers may be made from a metal material such as steel, stainless steel or any other material suitable for use in a reverse vending machine. The rollers may have a central hollow core portion for reducing the weight of the roller. The rollers may be substantially identical however the rollers may also differ. For instance one of the two rollers may have a larger or smaller diameter or the rollers may have different length in the axial direction.

The working surface is the surface of the roller which is normally in contact with containers when the container compressing arrangement is operated to compress containers. Between the rollers, in the compressing arrangement, is a roller gap. When a container is fed through the roller gap the two rollers compress and flatten the container. A container may be e.g. a plastic or aluminum bottle or a metal can e.g. an aluminum can. At the longitudinal ends of each of the rollers there may be a shaft portion for mounting, and supporting, of the rollers in e.g. a reverse vending machine. The shaft portion may be arranged to be connected to means for rotating the roller such as a belt, chain or the like connected to a drive unit, e.g. an electric motor. The shaft portions may further comprise means for configuring the rollers such that the roller gap is adjustable. Each roller comprises a working surface, e.g. the cylindrical surface, where the roller is arranged with ridges.

The ridges should be construed as extending along the working surface of the roller, parallel to the rotation axis of the roller. The ridges may include some variations along a path of the longitudinal extension of the ridge along the working surface of a roller. Such variations may include that the width or the height, as well as the cross-sectional shape, of the ridge varies along the axial direction.

The ridges may have an axial extension being 50% to 100% of the length of the working surface of a roller, as seen in the direction of the ridge. The ridges may extend for the whole length or for a part of the length of the working surface. When the ridges extend for part of the length of the working surface of a roller each ridge may form part of a set of ridges delimited along a line parallel to the axial direction of the working surface of a roller.

Additionally or alternatively at least one of said ridges of at least one roller is provided with recesses extending in the axial direction, and wherein the recesses form a clearance between the rollers in the x-direction. The recesses may help with the gripping, or pulling down of container into the gap, of the container compressing arrangement. The recesses create a clearance in the x-direction, of the xy-plane, between the two rollers. Clearance may be construed as in a light opening arranged between the two rollers, such that light may shine in a y-direction, of the xy-plane, through the recesses of the ridges defining or forming the roller gap.

Additionally or alternatively said recesses may be aligned in the circumferential direction, i.e. if one ridge has a recess at a certain point in the axial direction or at a certain point along the working surface, all ridges have a recess at this point in the axial direction or at this point along the working surface. In other words, the teeth of the roller are aligned in the circumferential direction.

Additionally or alternatively, each ridge extends in a direction parallel with the axial direction, and/or the teeth of the roller are aligned in the axial direction Additionally or alternatively the ridges comprises recesses distributed along said axial direction of said ridges, said recesses having a maximum depth being in the range of 1 mm to 10 mm, preferably in the range of 1 mm to 5 mm, more preferably in the range of 1 mm to 2 mm. The recesses of the ridges may be evenly distributed along the axial direction of the ridges. The recesses may be distributed along the axial direction of the ridges unevenly or grouped in cluster. Recesses may have a maximum depth, measured from an edge formed between the ridge and the recess and a bottom most point of a recess being in the range of 1 mm to 10 mm, preferably in the range of 1 mm to 5 mm, more preferably in the range of 1 mm to 2 mm. A cross sectional shape of a recess, seen in a direction perpendicular to the axial direction of a roller, may be construed as being largely U-shaped or V-shaped. Other cross sectional shapes may also be possible.

Additionally or alternatively the centre-to-centre distance between two adjacent recesses is between 1% and 50% of a length L of said working surface. The recesses may be distributed having a centre-to-centre distance between 1% to 50% of the length of the working surface, in the axial direction. Additionally or alternatively the recesses may be arranged such that at least one recess is arranged per 100 mm section length, preferably at least one recess per 50 mm section length, more preferably at least one recess per 15 mm section length of a of a working surface of a roller, in the axial direction of said roller.

Additionally or alternatively the ridges comprises a leading surface and a trailing surface, and wherein an edge between said leading surface of a first ridge meets with said trailing surface of an adjacent ridge. The ridges may be described as comprising, or consisting of, a leading surface and a trailing surface. The leading surface of a ridge is the surface first coming into contact with a container to be compresses by the container compressing arrangement. The leading surface may also be said to be arranged ahead of the trailing surface of a ridge, in the rotational direction of a roller. The trailing surface is the surface arranged on the opposite side of the top of the ridge, and being part of the same ridge. The leading surface and the trailing surface of two adjacent ridges may be joined along an edge. The edge between the leading and trailing surfaces of a ridge thus may be said to form an apex.

Additionally or alternatively the edge between said leading surface of a first ridge meets with said trailing surface of an adjacent ridge, has a radius (Re) in the range of 0 mm to 5 mm, preferably in the range of 0.5 mm to 3 mm, more preferably in the range of 1 mm to 2 mm. Having a radius of the edge between a leading surface of a first ridge and a trailing surface of an adjacent ridge being in the range of 0 mm to 5, preferably between 0.5 mm to 3 mm, more preferably between 1 mm to 2 mm has been found advantageous for increasing the ridges ability to grip and pull down container into the roller gap.

Additionally or alternatively the ridges further comprises an interconnecting surface, said interconnecting surface interconnecting said leading and trailing surfaces. An interconnecting surface may be arranged interconnecting the leading surface and the trailing surface of a ridge. The ridge may thus be described as comprising a leading edge, formed between the leading surface and the interconnecting surface of a ridge. Additionally the ridge may be described as comprising a trailing edge formed between the interconnecting surface and the trailing surface of a ridge. Having an interconnecting surface may be advantageous in that the contact area between a container being compressed by the container compressing arrangement and the interconnecting surface is increased. This reduces mechanical wear and mechanical stresses on the ridge. This in turn reduces the risk for mechanical failure of the rollers and increases fatigue life of the rollers. The resulting indentation or compression of a container by a ridge comprising an interconnecting surface is also advantageous.

Additionally or alternatively the leading surface, forms an angle in relation to a line parallel to a maximum radius, and wherein said angle is in the range of −20 degrees to +30 degrees, preferably in the range of −10 degrees to +20 degrees, more preferably in the range of 0 degrees to +10 degrees. The leading surface forms and angle in relation to a line parallel to a maximum radius. The angle is in the range of −20 degrees to +30 degrees, preferably in the range of −10 degrees to +20 degrees, more preferably in the range of 0 degrees to +10 degrees. By a positive angle the leading surface slopes in a direction from the leading edge and radially inwards. By a negative angle the leading surface may be disclosed as having an overhang.

Additionally or alternatively the trailing surface forms a largest angle to said interconnecting surface, and wherein said largest angle is in the range of 190 degrees to 260 degrees, preferably in the range of 190 degrees to 240 degrees, more preferably in the range of 190 degrees to 220 degrees. The interconnecting surface forms an angle in relation to the trailing surface. By "largest angle" the angle referred to is the largest measurable angle between the two angles. As an example the angle between the two surfaces may be both 190 degrees, and 170 depending on if the angle between the two surfaces being referred to is the largest angle, 190 degrees, or the smallest angle, 170 degrees. When the two angles are added together the resulting angle is 360 degrees. The largest angle may also be described as the angle measurable on the outside surface, or working surface, of a roller. Advantageously, the largest angle between the interconnecting surface and the trailing surface of a ridge is the range of 190 degrees to 260 degrees, preferably in the range of 190 degrees to 240 degrees, more preferably in the range of 190 degrees to 220 degrees. However it may be possible to have a largest angle being in the range of 190 to 300 degrees.

Additionally or alternatively the trailing surface has a width being a multiple of the width of the interconnecting surface, said multiple being in the range of 1 to 20, preferably in the range of 2 to 15, more preferably in the range of 3 to 10. The width of the trailing surface, or the distance between a trailing edge formed between the interconnecting surface of a ridge and the trailing surface of this ridge and an edge between said trailing surface of this ridge and the leading surface of an adjacent ridge, may be a multiple of the width of the interconnecting surface. The interconnecting surface width being a length measured along the surface of a roller, in a circumferential direction. The width of the interconnecting surface may also be described as the shortest distance between the leading and trailing edges of a ridge, the leading and trailing edges defining the ends of the interconnecting surface as seen in the xy-plane. The width of the trailing surface may be described as the shortest distance between the ends of the trailing surface in the xy-plane. The inventors have advantageously found that the width of the trailing surface is preferably a multiple of the width of an interconnecting surface, the multiple being in the range of 1 to 20, preferably being in the range of 2 to 15, more preferably being in the range of 3 to 10.

Additionally or alternatively the roller has a maximum radius and a smallest radius, and wherein said ridges has a height, defined as the difference between said maximum and said smallest radius, said height being in the range of 2 mm to 20 mm, preferably in the range of 3 mm to 12 mm, more preferably in the range of 4 mm to 6 mm. The rollers may be described as having a maximum radius and a smallest radius. The largest radius being the largest distance, measured in a radial direction, between the rotation axis of a roller and an outermost point, arranged on a ridge, of a roller. Thus the rollers may be said to have a diameter being twice the maximum radius of a roller. The smallest radius may be described as the smallest distance, measured in a radial direction, between the rotation axis of a roller and a bottom most point arranged between two adjacent ridges of a roller. The height of a ridge may thus be described as the difference between the maximum radius Ro and the smallest radius Ri, Ro-Ri. The height of a ridge is in the range of 2 mm to 20 mm, preferably in the range of 3 mm to 12 mm, more preferably in the range of 4 mm to 6 mm. Further one of the rollers may comprise ridges having a first height, and/or design, and the second of the rollers may comprise ridges having a different height and/or design.

Additionally or alternatively each roller comprises 3 to 20 ridges, preferably 5 to 15 ridges, more preferably 6 to 12 ridges in an xy cross section of said roller. The ridges may be distributed, evenly around the circumference of the working surface of a roller. The inventors have found that and advantageous number of ridges on a roller is in the range of 3 to 30. The number of ridges may be in the range of 3 to 20 ridges, preferably 5 to 15 ridges, more preferably 6 to 12 ridges evenly arranged around the circumference of the working surface of the rollers, as seen in the xy-plane. The container compressing arrangement comprising 3 to 20 ridges is advantageous in that the resulting indentation pattern, or the shape of containers compressed by the arrangement, have a wave-shape or an s-shape which has been found to allow for better stacking or packing of compressed containers to be sent away for further recycling. The wave-shape further increases the rigidity of a compressed container meaning that the compressed container is more likely to stay flat after being released from the rollers and thus prevents the compressed container from becoming a curved into a "banana" or semi barrel shaped after being compressed. The wave-shape allows for a container to hold more, or a larger number of, compressed containers compared to containers not having this wave-shape. The container compressing arrangement may thus be said to be better and more advantageous for the environment. The number of ridges have also been found to result in advantageous compressed containers while reducing the mechanical wear of the rollers, of the container compressing arrangement thus, resulting in an increased mechanical life of the container compressing arrangement.

Additionally or alternatively the roller gap is in the range of 0.5 mm to 10 mm, preferably in the range of 1 mm to 8 mm, more preferably in the range of 1 mm to 6 mm. The roller gap may vary, between a largest and a smallest value, as the rollers counter rotate. The roller gap may be defined by the smallest distance, along an x-axis, of the xy-plane, or by the centre-to-centre distance, between the rollers as the rollers counter rotate in a meshed co-operation. The smallest value of the roller gap is in the range of 0.5 mm to 10 mm, preferably in the range of 1 mm to 8 mm, more preferably in the range of 1 mm to 6 mm. The roller gap may also be described as a function of the distance between the respective rotation axes of the rollers, the maximum radius and the smallest radius of the respective rollers as well as the angle with by which the rollers are rotationally offset. By rotationally offsetting one of the rollers in relation to the co-operating roller, the meshing feature of the container compressing arrangement may be attained. The roller gap may be varied depending on the wall thickness of containers to be compressed by the container compressing arrangement.

Additionally or alternatively the maximum diameter of each roller is in the range of 50 mm and 100 mm, preferably in the range of 60 mm to 90 mm, more preferably in the range of 70 mm to 80 mm. The maximum diameter of each rollers may be the same or different. If the diameters of the rollers differ one roller may rotate having a higher rotation speed than said other roller.

Additionally or alternatively the working surface has a maximum length, in a direction parallel to said respective rotation axes, in the range of 50 mm to 750 mm. The length of the working surface of a roller is preferably in the range between 50 mm to 750 mm. It may be possible to have a length of the working surface of a roller being larger than 750 mm. For instance, a container compressing arrangement mounted in larger recycling machine located in a recycling facility may have rollers comprising a working surface having a length being larger than 750 mm, and may thus be able to compress a larger number of containers than a container compressing arrangement mounted in a reverse vending machine.

Additionally or alternatively the interconnecting surface, and/or said leading surface, and/or said trailing surface has a width in the range of 0.5 mm to 10 mm, preferably in the range of 2.5 mm to 8 mm, more preferably in the range of 5 mm to 6 mm. The width of the interconnecting surface, and/or the leading surface, and/or the trailing surface may be measured along the surface of the roller, in a circumferential direction in the xy-plane, and may then be in the range of 0.5 mm to 10 mm, preferably in the range of 2.5 mm to 8 mm, more preferably in the range of 5 mm to 6 mm. The interconnecting surface, and/or said leading surface, and/or said trailing surface extend(s) along the surface of the roller; these surfaces may also be referred to as extending a length in a direction, for example along an arc, or along a straight line, or along the circumference of the roller defined by the outer maximum radius, in the xy-plane. Additionally or alternatively, the interconnecting surface, and/or said leading surface, and/or said trailing surface is/are substantially planar or planar, where planar is used in the meaning non-curved/non-arched. The length of the surfaces may vary depending on the number of ridges and/or their design. Further, a ridge may be designed not having an interconnecting surface.

Additionally or alternatively, by rotating one of said rollers around said rotation axis, the width of said roller gap is adjusted. The roller gap may be adjusted by rotating one roller around the rotation axis, while the other roller is locked in place, i.e. the other roller not being rotated. This allows for the roller gap to be increased or decreased without changing the centre-to-centre distance of the rollers of the container compressing arrangement. This may be advantageous by the same container compressing arrangement being able to configure for compressing containers having different wall thickness. A reverse vending machine comprising the container compressing arrangement may thus be configurable for managing different regional restrictions in the world. The trailing ridges of the rollers may be arranged so that a linear, or almost linear, relationship is achieved between the amount of rotational adjustment, or rotating of one roller in respect to the other roller, and the roller gap width.

Additionally or alternatively the first and second rollers are rotatably aligned such that, wherein alternatingly said roller gap is defined along a centre-to-centre axis of the roller arrangement, by:

said leading edge of a ridge on said first roller is arranged opposite a trailing surface on said second roller; and said leading edge of a ridge on said second roller is arranged opposite a trailing surface on said first roller.

The rollers may be arranged to rotate such that the roller gap is alternatingly defined, along a centre-to-centre axis of the container compressing arrangement. The centre-to-centre axis defined as an axis between the respective rotation axes of the rollers. Alternatively the roller gap may be defined by: a leading edge of a ridge of a first roller being arranged opposite, along the centre-to-centre axis, a trailing surface of a ridge of a second roller; and a leading edge of a ridge of a second roller being arranged opposite a trailing surface of a ridge of a first roller. The rollers may be arranged so that the leading edge of a roller meets with a trailing surface, close to a mid section, of a co-operating roller. The mid section may be the middle, third, section of the trailing surface. The leading edge may also meet with a trailing surface, close to either end section of the trailing surface. The end sections being a third portion of the trailing surface on either side of the mid section. When the rollers comprise an outer interconnecting surface, an interconnecting surface of a first roller may be said to meet with a trailing surface of a second roller, in the roller gap, along the centre-to-centre axis. By "meet" the working surfaces of the rollers are close but not in contact with each other. The roller gap may be said to have a varying width along the x-axis of the xy-plane, as the two rollers counter rotate. The roller gap width may vary in the range of 0.1 mm to 5 mm. However, the range may be smaller or larger depending on the design of the ridges of the rollers.

According to a second aspect the present invention relates to a reverse vending machine comprising a container compressing arrangement according to any one of the preceding claims is provided. The inventors have found that the container compressing arrangement is advantageous to mount in a reverse vending machine.

According to a third aspect of the present invention a method of operating a container compressing arrangement, for compacting empty containers, in particular beverage bottles or cans which are preferably made of plastic or metallic material, such as PET or tinned metal, is provided, said container compressing arrangement comprising:
- a first and a second rotatable roller arranged to rotate according to said first aspect of the present invention. Advantageous for the third aspects are to a large extent analogous to the advantages described in relation to the first and second aspect. Thus the above advantages described in relation to the first and second aspect apply also to the third aspect.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing currently preferred embodiments of the invention. Like reference elements refer to similar or substantially similar elements throughout the drawings.

FIG. 2b shows an enlarged partial view one of the rollers shown in FIG. 2a.

FIG. 3b shows a top view of the roller shown in FIG. 3a.

DETAILED DESCRIPTION OF EXAMPLE EMBODIMENTS OF THE INVENTION

Figure 1:
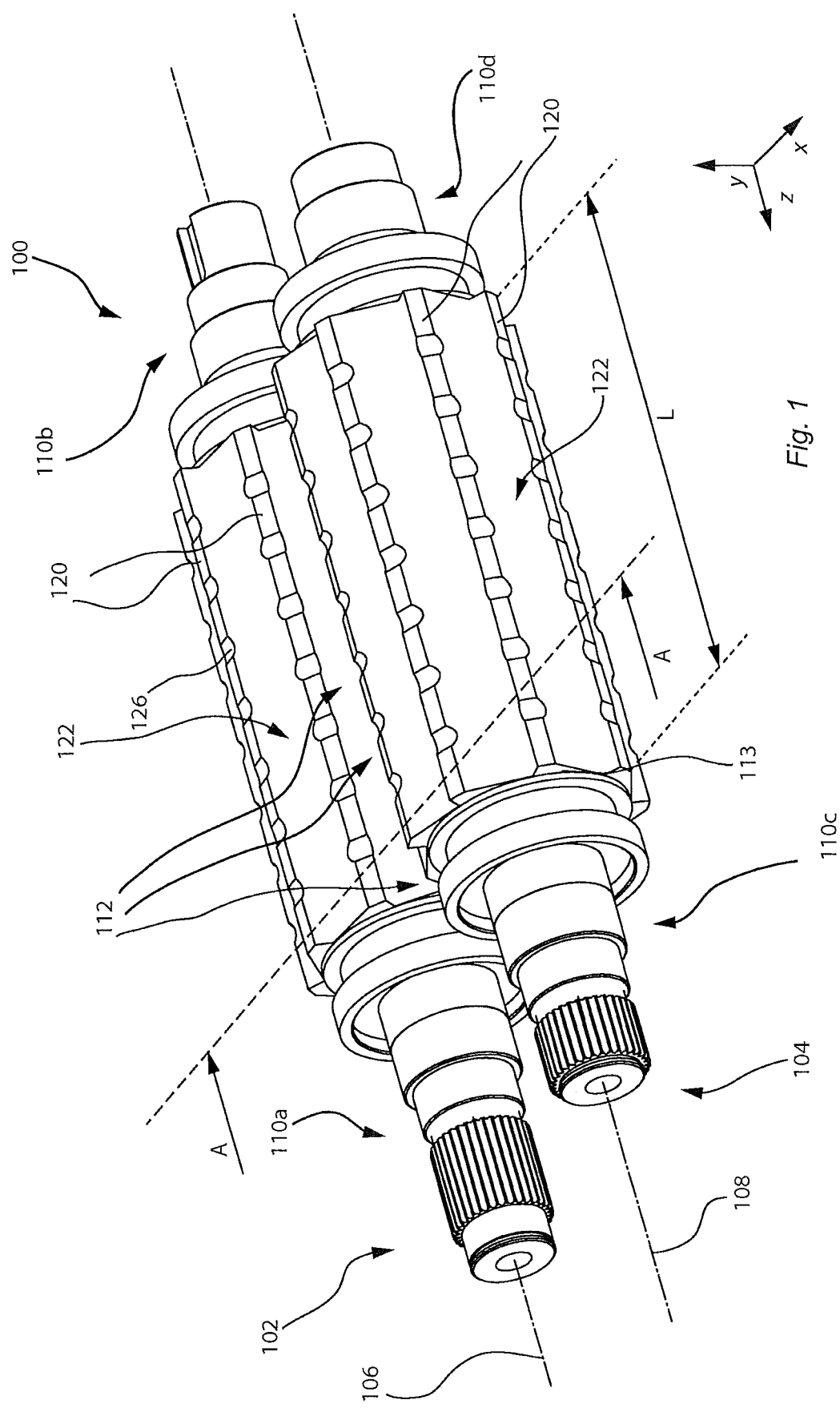
FIG. 1 shows a container compressing arrangement according to at least one exemplary embodiment of the invention.

In the present detailed description, exemplary embodiments of a container compressing arrangement according to the present invention are mainly discussed with reference to schematic views showing a container compressing arrangement according to various embodiments of the invention. It should be noted that this by no means limits the scope of the invention, which is also applicable in other circumstances for instance with other types or variants of container compressing arrangements or components than the embodiments shown in the appended drawings. Further, that specific components or features are mentioned in connection to an embodiment of the invention does not mean that those components cannot be used to an advantage together with other embodiments of the invention. The invention will now be described with reference to the enclosed drawings where first attention will be drawn to the structure, and secondly to the function. Like reference characters refer to like elements throughout the description.

Further, in the following description, the present invention is partly described using specific dimensions of exemplary rollers, or the features of the rollers. However, these dimensions are only for exemplifying purposes and thereby not limiting for the scope of the invention.

FIG. 1 illustrates an example container compressing arrangement 100 according to an embodiment of the invention. The container compressing arrangement 100 comprises a first roller 102 and a second roller 104 arranged adjacent to each other. The first roller has a rotation axis 106, and the second roller has a rotation axis 108. The rotational axes 106, 108 of the first and the second roller 102, 104 are arranged in parallel. The first and the second roller 102, 104 are arranged to rotate in opposite directions, thus the first 102 and the second 104 roller counter-rotate. The rotational direction of the rollers is further indicated in FIG. 2a.

The rollers 102, 104 comprise shaft portions 110a-d for mounting the rollers 102, 104 in a reverse vending machine (not shown) in such a way that they may be rotated about their respective rotation axis 106, 108. The shaft portions 110a-d are arranged at the longitudinal ends of the rollers 102, 104. A largely cylindrical surface of each roller 102, 104 may be defined as a working surface 122. The working surface 122 has a length L in the longitudinal direction of the roller 102, 104, the longitudinal direction being parallel to the respective rotational axis 106, 108 of a roller 102, 104. The longitudinal direction may also be referred to as the axial direction of a roller 102, 104 being parallel to the z-direction indicated by the xyz-coordinate system in FIG. 1. The working surface 122 is arranged between the opposing shaft portions 110a-110b, 110c-11d. A working region 112 is arranged in the nip, or gap, where the working surfaces 122 of the two rollers 102, 104 meet. The gap, or roller gap Rg, may be the region where the distance between the two rollers 102, 104 is the shortest along an x-direction of the xyz-coordinate system. The roller gap Rg is shown and described in relation to FIG. 2a. The working region 112 is where containers are compressed when the container compressing arrangement 100 is being operated.

Each roller further comprises a plurality of ridges 120 provided on the working surface 122 of the rollers 102, 104. The ridges 120 have a longitudinal extension along the working surface 122, in the axial direction of the rollers 102, 104. The rollers 102, 104 may also be described as having cylindrical core portion 113 comprising ridges 120 in the form of protrusions, protruding outwardly from the cylindrical core portion 113 of the respective roller 102, 104 and having a longitudinal extension, in the axial direction. Alternatively the ridges 120 may be described as roller teeth having a longitudinal extension in the axial direction. The ridges 120 will be further disclosed in relation to FIG. 2a.

The rollers 102, 104 further comprise a plurality of recesses 126 arranged on the working surface 122 of the roller 102, 104. The recesses 126 will be further described in relation to FIG. 3a-3c. FIG. 1 shows ridges 120 comprising seven recesses 126, but it is possible for a roller 102, 104 to comprise more or fewer recesses 126. The number of recesses 126 may vary, e.g. depending on the length L of the working surface 122 and the diameter A (shown in FIG. 2a) of a roller 102, 104. The advantageous number of recesses 126 may also depend on the dimensions and design and arrangement of each recess 126. As an example at least one recess may be arranged per 100 mm section length, preferably at least one recess per 50 mm section length, more preferably at least one recess per 15 mm section length of the of a working surface 122 of a roller 102, 104.

The ridges 120 continuously extend across the full length L of the working surface 122 as the depth of the recess is smaller than the height of the ridge. A typical working surface 122 of a roller 102, 104 has a length L in the range of 50-750 mm. In the embodiments shown in the appended drawings the ridges 120 are only partly intersected by the recesses 126 such that the ridges 120 continuously extend for the entire length L of the working surface 122 of the rollers 102, 104. The recesses 126 are shown as all having the same design; however the recesses 126 may be made having different shapes and dimensions. For instance a recess 126 having a first width and depth may be followed by ridge having a different width and depth. The recesses 126 may have one shape and design close to the middle of the working surface length L, and a second shape and design close to the shaft portions 110 of a roller 102, 104. The recesses 126 may improve the can gripping ability of the container compressing arrangement 100. The recesses 126 are shown as being evenly distributed, in the axial direction, along the ridges 120. The recesses 126 may be arranged having varying intermediate intervals between two adjacent recesses 126 on a ridge 120, or having a constant, or fixed, intermediate distance between two adjacent recesses 126.

The recesses 126 may be designed as radial grooves extending around the circumference of the working surface 122 of a roller, so that the ridges 120 are fully intersected by the radial grooves (not shown). Further, the ridges 120 may extend for only a part of the length L of the working surface 122 of the rollers 102, 104 leaving part of the working surface 122 not arranged with ridges 120. For instance the ridges 120 may start and end at a distance from the ends, defined by the axle portions 110, of the working surface 122. It should be noted that the recesses 126 are optional for the core functionality of the rollers 102, 104. However providing the ridges with recesses 126 may improve the performance of the container compressing arrangement 100. The ridges 120 are shown being parallel to and extending in the axial direction of the the rotational axes 106, 108 of the rollers 102, 104. Further, the ridges 120 may be designed or manufactured so that the dimensions, or cross sectional shape in a xy-plane, of the ridges 120 varies along the length L of the working surface 122. Such deviation may be purposely be added to the ridges 120 or may be due to imperfect manufacturing techniques, or due to intent to create additional edges which may grip a container to be compressed.

As can be seen in FIG. 1 all recesses are aligned in the circumferential direction, i.e. if one ridge has a recess at a certain point in the axial direction or along the length L of the working surface, all ridges have a recess substantially at this point in the axial direction or at this point along the length L of the working surface, i.e. there is no substantial off-set between the recesses in the circumferential direction. Moreover, the teeth of the roller are aligned both in the axial and circumferential direction.

The ridges 120 may be spaced apart evenly or symmetrically around the circumference of the working surface 122 of the roller 102, 104. A ridge 120 may thus be said to occupy a segment or a section, definable by an angle. For instance for a roller 102, 104 comprising 8 ridges evenly arranged around the circumference of the roller 102, 104, each ridge 120 may be said to occupy a section, or angle, of 360/8=45 degrees. The ridges 120 may also be arranged or spaced apart, asymmetrical such that a higher density of ridges 120 is created on a portion of the roller 102, 104 (not shown). The ridges 120 may also be arranged in groups of ridges (not shown).

Additionally, the can compressing arrangement 100 may optionally comprise a paddle feed system arranged for feeding containers from an container load opening to the rollers 102, 104, and in particular to the roller gap (not shown). The paddle feed system may comprise a paddle feed roller comprising a plurality of paddles, arranged around a central axle. The axle of the paddle feed roller may be rotatable around a central axis being parallel to the rotation axes of the rollers 102, 104. When the rollers 102, 104 rotates and containers are fed into a reverse vending machine comprising the paddle feed system, the paddle feed roller pushes the containers from an container load opening of the reverse vending machine downwards to the working surfaces 122 of the rollers 102, 104, and in particular towards the roller gap between the rollers 102,104. The paddle feed system thus helps feeding containers through the roller gap which may increase the performance of the container compressing arrangement.

An outer edge, distant from the central axle of the paddle feed roller may comprise a toothed design for increasing the gripping or pulling of containers from the container load opening of the reverse vending machine. Further an outer edge portion of the paddles of the paddle feed roller may be bent or shaped having an angle in relation to a middle portion of the paddles. The paddles may then be said to have an L-shape. The paddles of the paddle feed roller may also have a convex or concave shape as seen in an axial direction of the central axis of the paddle feed roller.

The paddle feed roller may rotate at a rotational speed being slower than the rotational speed of the rollers 102, 104. It may however be configured to rotate at the same, or faster rotational speed as compared to the rotational speed of the rollers 102, 104. The paddle feed roller may comprise 3-10 paddles, arranged around the circumference of the roller, preferably 3-6 paddles, more preferably 4-6 paddles. The paddle feed roller may be arranged with a number of paddles such that a container being compressed may be received in the space between two adjacent paddles of the paddle feed roller.

Figure 2A:
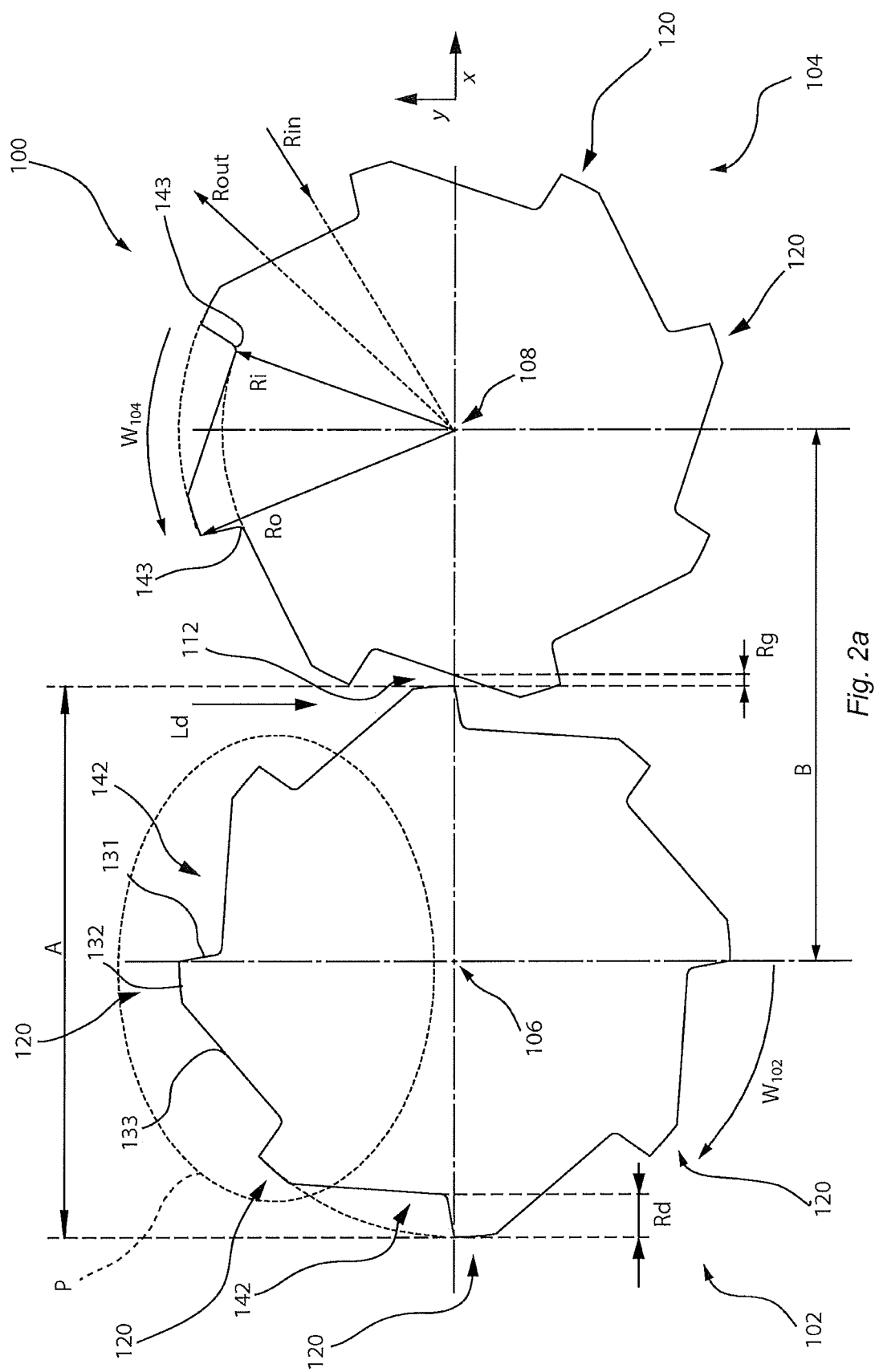
FIG. 2a shows a cross sectional view along the line A-A of the container compressing arrangement in FIG. 1.

FIG. 2a illustrates a cross sectional view taken along the line A-A of the container compressing arrangement 100 shown in FIG. 1. The first roller 102 is arranged to be rotated clockwise around the rotational axis 106, as indicated by arrow $W_{102}$. The second roller 104 is arranged to be rotated in an opposite, counter-clockwise, direction around the rotational axis 108, as indicated by arrow $W_{104}$. The arrows $W_{102}$ and $W_{104}$ may also indicate the rotational speed of the rollers 102, 104. During use, the rotational speeds $W_{102}$ and $W_{104}$ are substantially the same. For example, only the first roller 102 may be driven while the second roller 104 is connected to the first roller 102 via a gear, a belt, a chain, or the like. Alternatively, the rotational speeds $W_{102}$ and $W_{104}$ may differ slightly. Further, if one of the rollers has a larger diameter than the other roller the rotational speed of one of the rollers may be increased or decreased to compensate for the difference in diameters between the two rollers 102, 104 (not shown).

In relation to this invention the term "radially outwards" is a direction from, as well as perpendicular to, the rotation axis 106, 108 of a respective roller 102, 104, as indicated by the arrow Rout in FIG. 2a. Likewise, in relation to this invention the term "radially inwards" is a direction towards, as well as perpendicular to, the rotation axis 106, 108 of the respective roller, as indicated by the arrow Rin in FIG. 2a.

Each roller 102, 104 comprises an outer, maximum radius Ro, extending between the rotation axis 106, 108 and the top of the leading surface of the ridge 120 of a roller 102, 104. The outer most point of a ridge 120 may be arranged on a surface or on an edge, defined between two meeting surfaces. The outer radius Ro may be within the range of 25 mm to 50 mm. For example, the outer radius Ro may be approximately 35 mm. The shortest radius Ri to the bottommost point of the ridges 120 is typically within the range 15 mm to 45 mm. For example, the radius Ri may be approximately 34 mm. The number of ridges may be 3 to 14, or 5 to 12 or 6 to 10 evenly arranged around the circumference of the working surface 122 of a roller 102, 104. Typically, and as shown in the drawings, there may be 8 ridges evenly arranged, or distributed, around the circumference of the rollers 102, 104. The cross sectional view of the rollers show the rollers 102, 104 being solid, however the rollers 102, 104 may have a hollow center portion for reducing the weight of the roller (not shown). FIG. 2a shows each ridge comprising a leading surface, 131, and a trailing surface 133 and between the leading surface 131 and the trailing surface 133 there is an interconnecting surface 132. The height Rd of a ridge 120 is defined as the difference between the outer radius Ro and the inner radius Ri. The height Rd of a ridge is in the range of 2 mm to 20 mm, preferably in the range of 3 mm to 12 mm, more preferably in the range of 4 mm to 6 mm. For example, the height Rd of a ridge 120 may be approximately 4.5 mm.

The distance between the working surfaces 122 of the two rollers along the x-axis, or the size of the gap between the two rollers 102, 104, is the roller gap Rg. As can be seen in the drawings the location and the size of the roller gap Rg along the x-axis varies as the rollers rotate, while the centre-to-centre distance between the rollers are constant. The variation may be in the range of 0.1 mm to 5 mm. The design of the ridges 120 and the arrangement between the rollers 102, 104 is such that there is no contact between the two rollers. The roller gap Rg is within the range 0.1-10 mm, preferably about 0.5 mm. The roller gap Rg may be configured based on the wall thickness of the containers to be compressed. Containers from different regional or geographical areas may have different wall thickness. For example, there are regions where aluminum bottles having a wall thickness of 2 mm are sold, which would typically mean that the roller gap Rg may be configured to be larger than 0.5 mm. The roller gap Rg may be configured by varying the distance B between the two rotational axes of the rollers. The distance B between the rollers is largely dependent on the diameters of the rollers of the roller arrangement. As such, the distance B may be within the range 50-100 mm.

During use, the first and second roller 102, 104 counter-rotate in their respective rotational directions $W_{102}$ and $W_{104}$. Containers to be compressed are received or fed in the direction indicated by the arrow Ld into the working region 112 between the two rollers 102, 104. The containers are compressed, or flattened, between the two rollers 102, 104 and then released downwards, in the negative y-direction as seen in relation to FIG. 2a. The rollers shown in FIG. 2a have a largest diameter A defined as two times the outer, maximum Radius Ro of a roller 102, 104.

Figure 2B:
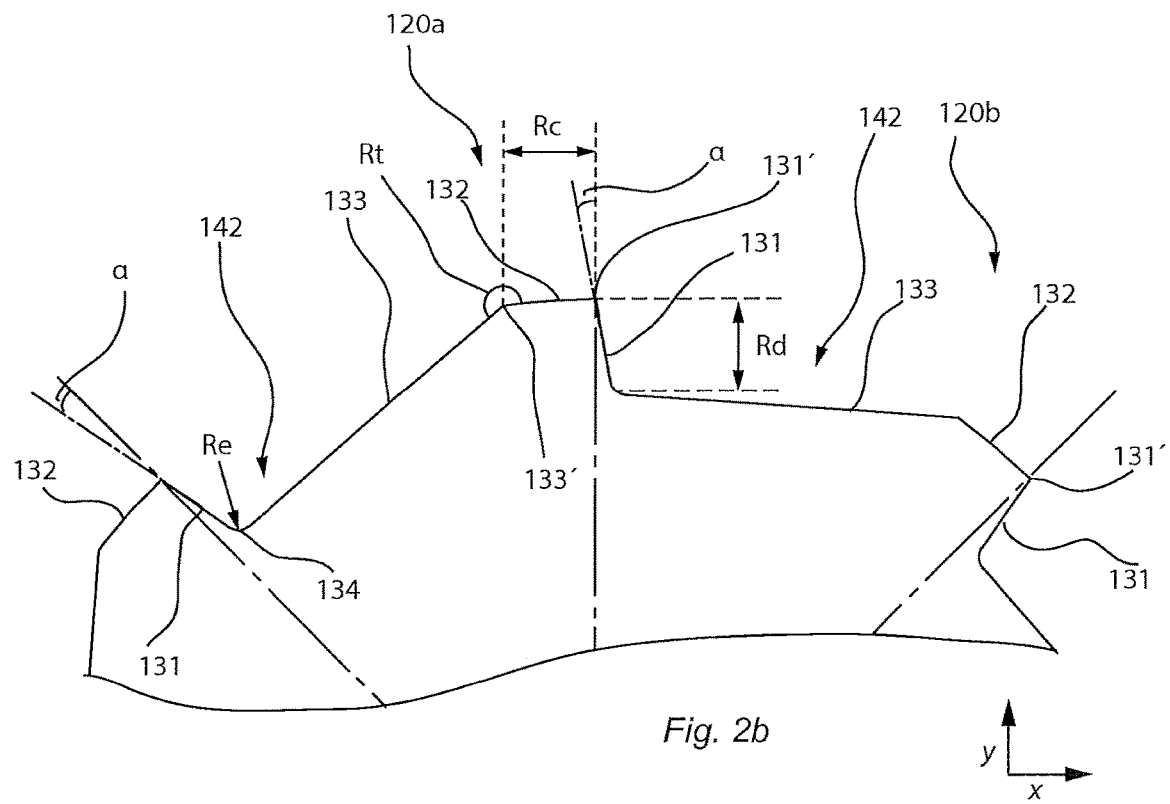

FIG. 2b shows an enlarged partial view of a portion P of the roller 102 shown in FIG. 2a showing a more detailed cross sectional view of the ridges 120. Each ridge 120 comprises a leading surface 131, a trailing surface 133 and an interconnecting surface 132 arranged there between, and interconnecting the leading and trailing surfaces 131, 133. Two adjacent, or neighboring, ridges 120a, 120b may be seen as being connected by an intermediate groove 142. The intermediate groove 142 may be seen as having a bottommost point 143, and a shortest radius Ri extends between the rotation axis 106, 108 and the bottommost point 143 or an intermediate groove 142. A leading surface 131 of a first ridge 120a is arranged opposite from a trailing surface 133 of a second ridge 120b, and an intermediate groove 142 may be said to be formed between said leading and trailing surfaces 131, 133 of the first and second ridges 120. The interconnecting surface 132 has width Rc, shown in FIG. 2b extending between the leading and trailing edges 131', 133' of a roller 102, 104. The width Rc is in the range of 1 mm to 10 mm, preferably in the range of 4 mm to 8 mm, more preferably in the range of 5 mm to 6 mm. The width Rc may further have a width being 0 mm or close to 0 mm, for instance 0.5 mm, such that a ridge 120 only comprise a leading surface 131 and a trailing surface 133 (not shown). The width Rc, shown in FIGS. 2b and 2c, may be said to extend in the xy-plane. The edge 134, connecting a leading surface 131 of a first ridge 120 and a trailing surface 133 of an second ridge 120, may comprise a radius, Re, being in the range of 0 mm to 5 mm, preferably in the range 0.5 mm to 3 mm, more preferably in the range of 1 mm to 2 mm.

According to one embodiment and as shown in FIG. 2b the leading surface 131 forms a slope from the interconnecting surface 132 towards a connecting edge 134. The connecting edge 134 is formed between the leading surface 131 on a first ridge 120 and a trailing surface 133 of a second ridge 120. The slope of the leading surface 131 is shown having a positive angle α compared to a radial direction. However the leading surface 131 may have a negative slope, a negative angle α. When the leading surface 131 comprises a negative slope, a negative angle α, the leading surface may be seen as having an overhang. The angle α of the slope is in the range of −20 degrees to +30 degrees, preferably in the range of −10 degrees to +20 degrees, more preferably in the range of 0 degrees to +10 degrees.

Shown in FIG. 2b is a largest angle Rt between the interconnecting surface 132 and the trailing surface 133 of a ridge 120. The largest angle Rt may also be described as the outside angle, the angle being measurable on the outside working surface 122 or a roller 102, 104. The largest angle Rt, together with the complementary angle is 360 degrees. Further shown in FIG. 2b is the height of a ridge Rd.

Figure 2C:
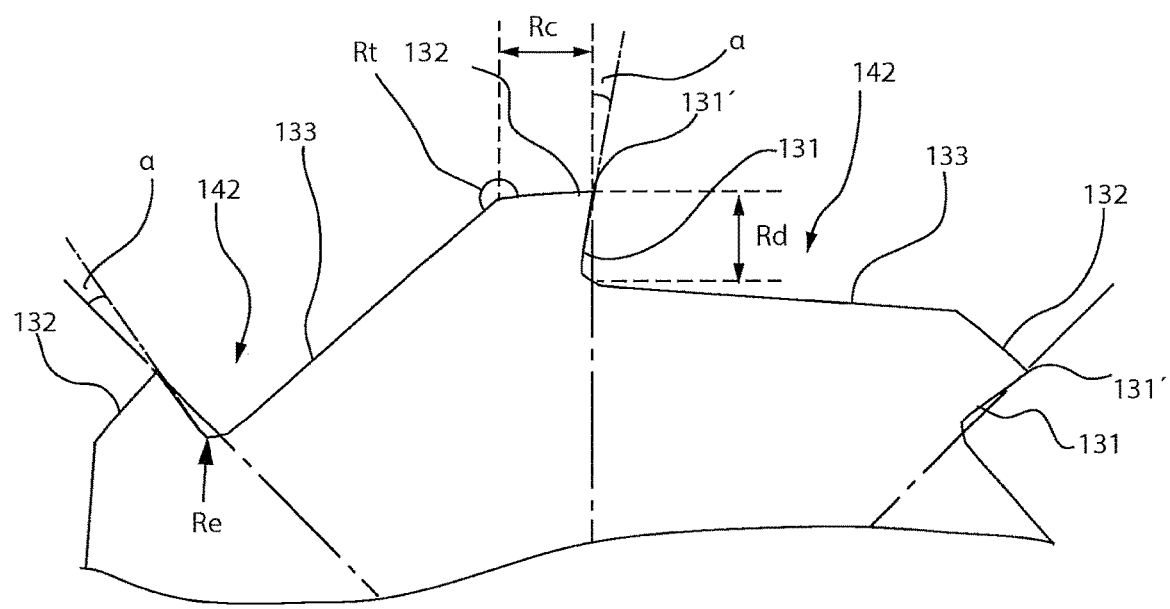
FIG. 2c shows an enlarged partial view of an alternative ridge design.

FIG. 2c shows a ridge 120 having a leading surface 131 with a negative slope α. The leading surface 131 can then be said to comprise, or consist of, an overhang. A negative slope results in that a sharper edge 131" is formed between the interconnecting surface 132 and the leading surface 131. A sharper leading edge 131" may that may help with gripping and pulling containers towards the roller gap Rg. A roller 102, 104 may comprise a combination of ridges 120 having positive and negative slopes, respectively. Similar to the leading surface 131 the trailing surface 133 may be described as comprising a slope. The slope of the trailing surfaces 133 depend e.g. on the number of ridges 120 on the rollers 102, 104 as well as the diameter of the roller 102, 104 and the size of the ridges 120. The trailing surface 133 shown in FIG. 2b-2c has a linear downwards slope towards the bottom of a leading surface 131 of an adjacent ridge 120. Alternatively the trailing surface 133 may be made having a different shape. The trailing surface 133, and/or the interconnecting surface 132 may comprise a convex or concave surface portion, or any other suitable shape connecting the interconnecting surface 132 of a first ridge 120 with a leading surface 131 of an adjacent ridge 120. The design of the interconnecting surface 132 and the trailing surface 133 of the ridges 120 of a roller 102, 104 may thereby be further adapted for compressing cans of different sheet metal thickness or different sheet materials.

In the respective embodiments illustrated in FIGS. 2a-2c the interconnecting surface 132, the leading surface 131 and the trailing surface 133 are each substantially planar.

Figure 3C:
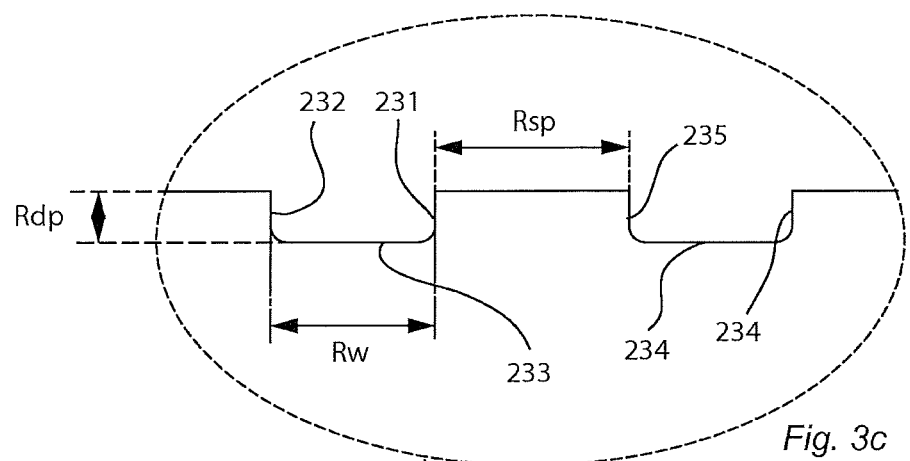
FIG. 3c shows an enlarged partial view of recess shown in FIG. 3b.
Figure 3B:
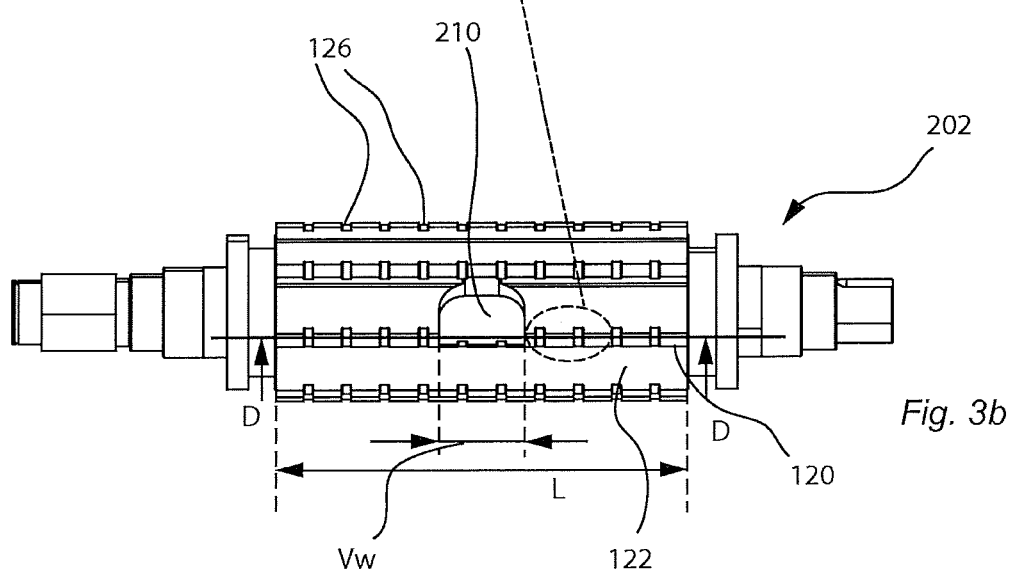
Figure 3A:
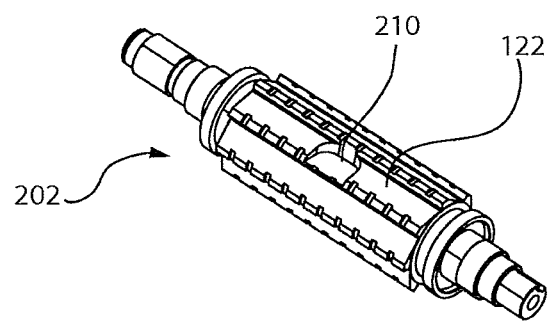
FIG. 3a show a perspective view of a roller according to at least one exemplary embodiment of the invention.

FIG. 3a shows a perspective view of an exemplary embodiment of a roller 202. FIG. 3b shows a side view of the same roller 202 shown in FIG. 3a. The roller 202 is arranged comprising a void 210, in the shape of a recess in the working surface 122 of the roller 202. The void 210 may be a large rectangular groove, or recess, in the cylindrical surface of the roller 202. The void 210 may be machined in the roller 202. The void may have a width Vw in the range of 30-35 mm, in an axial direction of the roller 202. The void 210 may have a maximum depth Vd of approximately 15 mm, e.g. in the radially inwards direction of the roller 202. The void 210 is arranged for helping can widgets pass through the working region 112, or roller gap, of a container compressing arrangement. Widgets are small, often plastic and spherical, objects contained in certain types of beer cans. Adding such widgets to beer cans is a well known technique for managing the characteristics of the beer's head and disclosed in U.S. Pat. No. 4,832,968. The void 210 allows a widget, during operation of a container compressing arrangement, to bounce around until it is either pulled through with a container or bounces into the void 210.

In a container compressing arrangement wherein both rollers comprises a void 210, the rollers e.g. are arranged such that an opening of a void 210 on a first roller never meets an opening of a void 210 on the second roller. One exemplary arrangement of the rollers may be that one of the rollers is rotationally offset around the rollers rotation axis 106, 108 by 180 degrees as seen in the direction of the rotation axis 106, 108. A roller may comprise one or several voids 210. The voids 210 may then be arranged adjacent the ends of the working surface 122 of a roller 202. The voids 210 may also be arranged evenly along the axial direction of a roller 202.

FIG. 3c shows an enlarged cross sectional view along D-D of a recess 126 shown in FIG. 3b. The recesses 126 are shown having a, essentially, U-shape. The recess as comprises two sidewalls 231, 232 and an intermediate bottom surface 233 connecting said sidewalls 231, 232. The respective sidewalls 231, 232 may have the same or different length such that an angle larger or smaller than 90 degrees is formed between either of the sidewalls 231, 232 and the bottom 233. One or both of the sidewalls 231, 232 may be made tapering towards the bottom 233. If both sidewalls 231, 232 are made having a slope towards the bottom 233 the recess may be said to be tapering towards the bottom 233. The slope may be in the range of ±45 degrees, preferably ±25 degrees, more preferably ±10 degrees or 0 degrees. FIG. 3c shows the edges 234 where respective sidewall 231, 232 and the bottom 233 meet having a rounded shape with a radius of 0.4 mm. Such a radius reduces the risks for cracks forming in the edge area which may result in mechanical fatigue and failure of the roller 202. The radius of the edges 234 may be in the range of 0.1 mm to 2 mm, preferably in the range of 0.2 to 1 mm, more preferably in the range of 0.3 mm to 0.5 mm. The recesses 126 has a maximum width Rw of 4 mm, measured at the opening, and a maximum depth Rdp of 1.25 mm. However, the recess may have a maximum depth Rdp of 1 to 10 mm, preferably 1 to 5 mm, more preferably 1 to 2 mm. The width Rw of a recess may be in the range of 2 to 25 mm, preferably 2 to 15 mm, more preferably 2 to 5 mm. The intermediate spacing Rsp between two recesses 126, or the distance between two sidewalls 232, 231 on two adjacent recesses 126, may be in the range of 5 mm to 100, preferably in the range of 10 mm to 50 mm, more preferably in the range of 15 mm to 25 mm. The roller 202 has a working surface length L being 160 mm, however the working surface 122 of the roller may be arranged having a length of 50 mm to 750 mm, preferably between 200 mm and 500 mm.

Figure 4A:
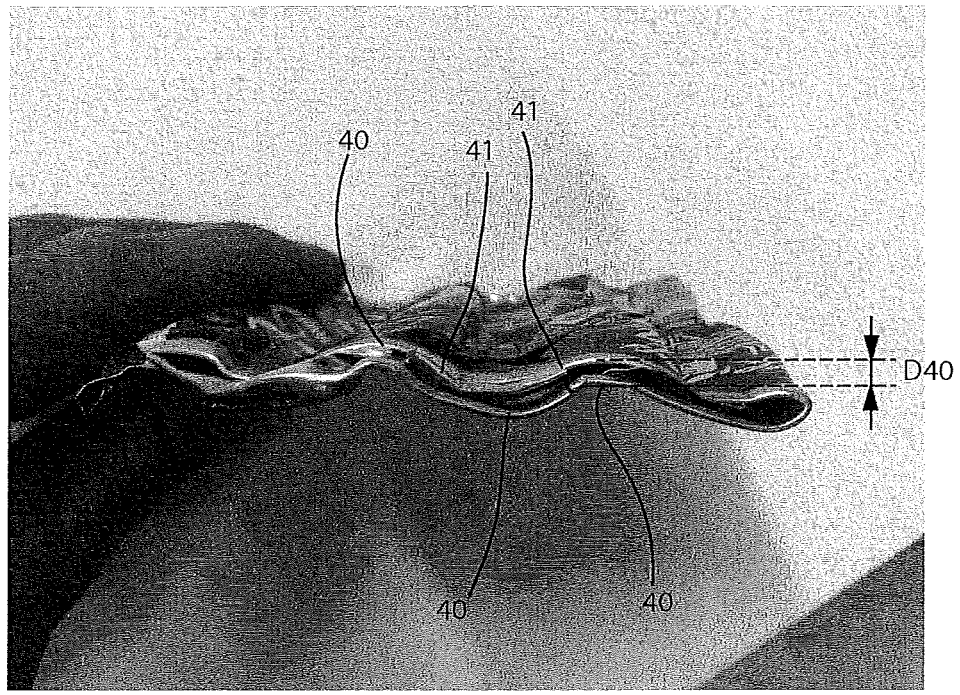
FIG. 4a-4b shows a shape of a compressed container being compressed by the container compressing arrangement according to at least one embodiment of the invention.
Figure 4B:
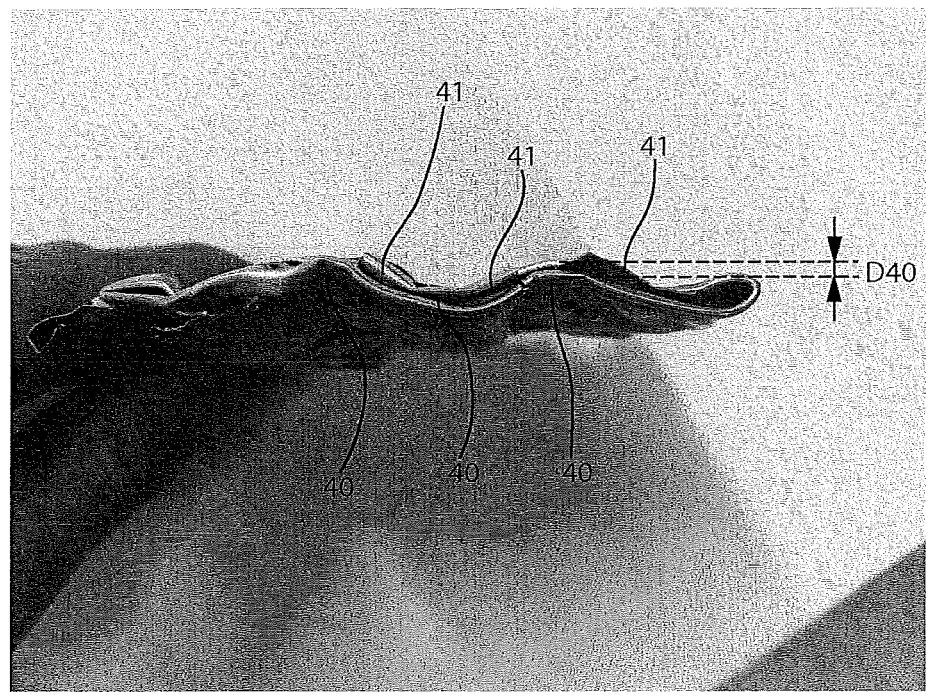

FIG. 4a-4b shows photographs with perspective views of a can compressed by the container compressing arrangement 100 as shown in FIG. 4a-4b, (drawn to scale). The cans have a flat and wave shaped pattern as seen from the side B. The wave-shape may be disclosed as having a sinus curve shape, wherein the wave-shape may be said have positive and negative peaks arranged around a center, median line. The flat wave-shape, or s-shaped shape, is advantageous for stacking compressed cans in a container. The compression pattern, or indentation pattern, in the compressed container, comprises portions of the can which can be seen as having different degrees of compression. The tops and bottoms 40 of the path or curvature defining the wave-shape comprises portions of the container having a large compression. The sheet material of the walls of the container have a minimum thickness $D_{40}$, at the point where the container has been compressed the most. The tops and bottoms 40 are the portions of the container being compressed by the interconnecting surface 132 of a ridge 120 on a first roller and the intermediate groove 142 of a second roller of the container compressing arrangement 100. The resulting compression, due to the resulting roller gap Rg, between the interconnecting surface 132 and the intermediate groove 142 having a smallest width. The compressed container further comprises intermediate portions 41, arranged between the tops and bottom portions 40 of the compressed container. The design of the ridges 120 and intermediate grooves 142 may result in different portions 40, 41 of the compressed container having different thickness. The indentation pattern shown in FIG. 4a-4b comprises a base curvature or path defined by the edge 42 of the compressed container and a longitudinal extension in a direction perpendicular to the edge 42 and extending inwards in the picture. The resulting shape of a compressed container may vary from container to container.

Figure 5A:
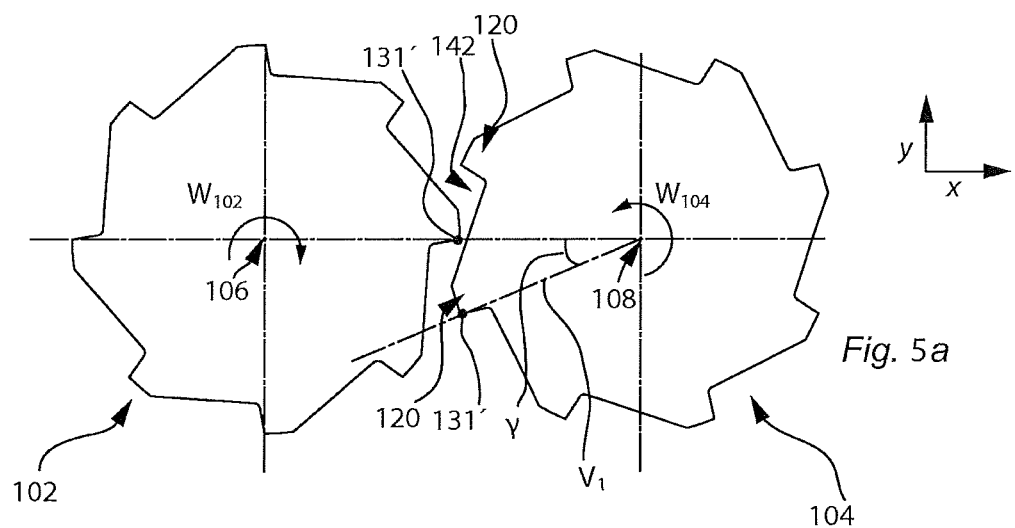
FIG. 5a-5c shows one example of the roller gap alternating between ridges and recesses on the respective rollers.
Figure 5B:
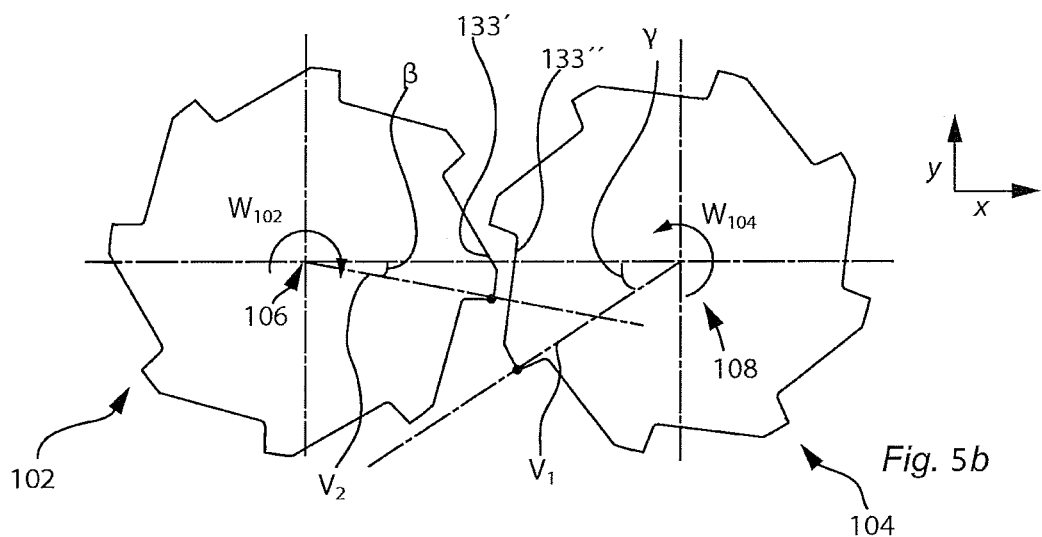
Figure 5C:
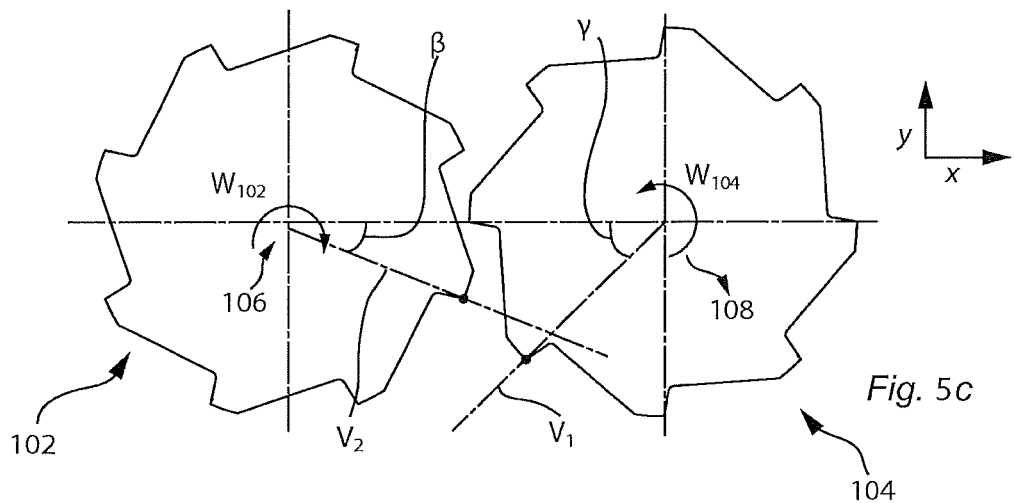

FIG. 5a-5c shows an example of how the roller gap may be alternatingly defined by a ridge 120 on a first roller 102 and an intermediate groove 142 of a second roller; and a ridge 120 arranged on a second roller 104 and an intermediate groove 142 arranged on a second roller 104. FIG. 5a shows a position where a ridge 120 of a roller 102 is arranged such that a straight line drawn from the rotational axis 106, of the first roller 102, intersecting the leading edge 131', coincides with a portion of the most adjacent intermediate groove 142 of the other roller. The leading edge 131' of the ridge 120 of the first roller 102 may then be said to directly face the intermediate groove 142 of the second roller 104, and vice versa for a leading edge 131 of the first roller 102 facing an intermediate groove 142 on the second roller 104. The position of the rollers 102, 104 shown in FIG. 5a may be said to be a starting position.

FIG. 5b shows the roller arrangement when both rollers 102, 104 have rotated 11.25 degrees around their respective rotation axes 106, 108. As the rollers 102, 104 rotate around their respective rotation axes 106, 108 the roller gap Rg is formed by parts of the roller lying in the trailing part of the working surface 122 of the rollers 102, 104. FIG. 5b shows a straight line $V_2$ drawn from the rotational axis 106, of the first roller 102, intersecting the leading edge 131', and coinciding with a portion of the most adjacent intermediate groove 142 of the other roller. In this figure said leading edge of the second roller 104 does not face the intermediate groove 142 on the first roller, as $V_2$ does not coincide with an intermediate groove 142 of the first roller 102. However, the leading edge of the first roller 102 faces an intermediate groove 142 of the second roller 104. The roller gap is defined by a trailing surface 133' of a first roller 102 and a trailing surface 133" of a second roller 104.

FIG. 5c shows the position wherein the rollers 102, 104 have rotated an additional 11.25 degrees so that the roller gap is defined by a ridge 120 of the second roller 104 and an intermediate groove 142 of the first roller 102. Both angles γ, β have thus also increased by 11.25 degrees. The position of the rollers 102, 104 shown in FIG. 5c is a mirror image of the position of the rollers 102, 104 shown in FIG. 5a, the mirroring being along a vertical line that is parallel to the y-direction. Thus for each full revolution of a roller 102, 104 the roller gap will be alternatingly be defined by a ridge 120 and an intermediate groove 142 a total of 16 times, there between it will be defined by two opposite intermediate grooves 142.

Figure 6A:
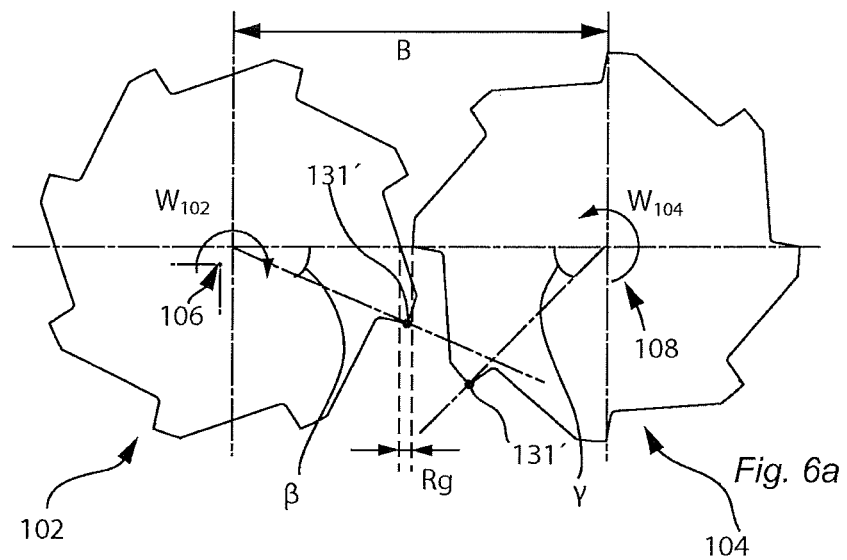
FIGS. 6a-6c show shows how the roller gap is adjustable according to at least one embodiment of the present invention.
Figure 6B:
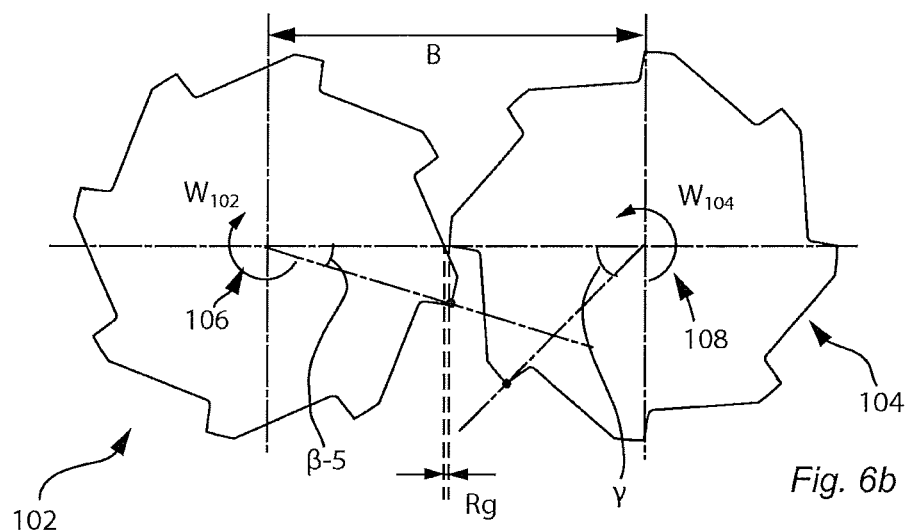
Figure 6C:
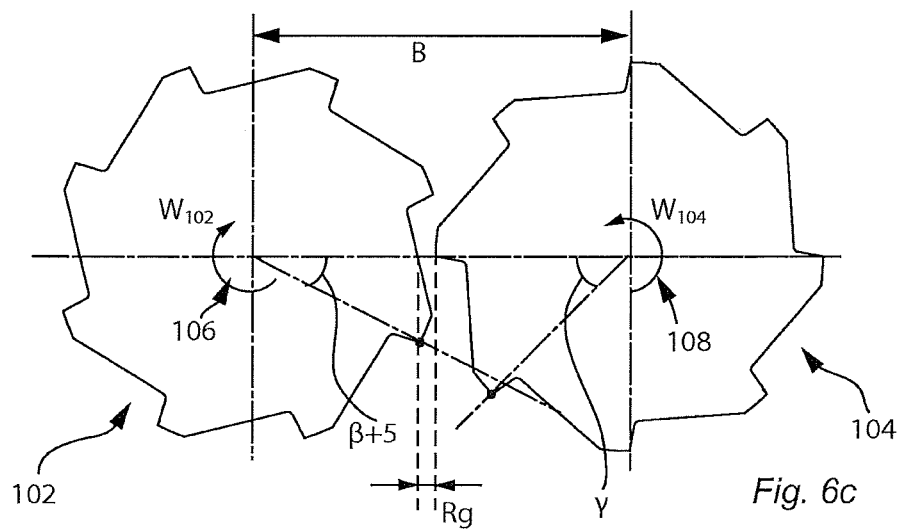

FIGS. 6a-6c schematic view for how the roller gap may be adjusted by rotating one of the rollers 102, 104 while the other roller is locked in position. This may be done without adjusting or changing the distance B between the two rotation axes 106, 108 of the two rollers 102, 104. This may be done when configuring the roller 102, 104 in a reverse vending machine or may be done during operation. FIG. 6a shows a first and a second roller 102, 104 each having 8 ridges arranged for normal operation wherein the angle γ, described in FIG. 5a-5c, is 22.5 degrees. The angle β of the opposing second roller 104 is locked, thus being 45 degrees, through FIG. 6a-6c. FIG. 6b shows the same arrangement wherein the first roller 102 has been adjusted negative 5 degrees, so that the angle γ is reduced by 5 degrees (γ−5 degrees). Adjustment may be done by rotating the first roller 102 back 5 degrees in relation to the second roller 104, when the second roller 104 is locked. This decreases the distance between the ridge 120 on the second roller 104 and the trailing surface 133 being part of the intermediate groove 142 of the first roller 102. The roller gap now has a reduced width Rg, a width being smaller than the width of the arrangement shown in FIG. 6a. The roller arrangement may thus be better set up for compacting cans having a low material wall thickness. This is advantageous by the container compressing arrangement being adjustable without the need to actuate or move one of the rollers so that the distance B between the rotation axes 106, 108 of the rollers 102, 104 is increased or decreased.

FIG. 6c shows an example wherein the first roller 102 has been rotated and adjusted positive 5 degrees, so that the angle γ is increased by 5 degrees (γ+5 degrees). As can be viewed in FIG. 6c this increases the roller gap, Rg, between the first and second rollers 102, 104. Increasing the roller gap by adjusting the first roller 102 by positive 5 degrees allows for compressing containers having a larger wall material thickness.

Figure 7A:
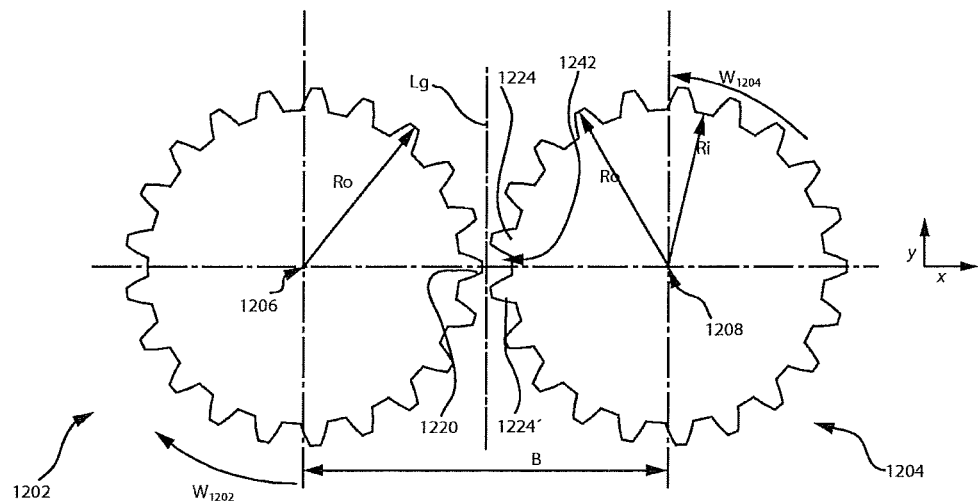
FIG. 7a-7b shows two rollers in a meshed, and in a non-meshed, and contactless co-operation.

FIG. 7a shows two rollers in a non-meshed contactless co-operation. A first roller 1202, and a second roller 1204 is arranged to counter-rotate, in a respective rotational direction $W_{1202}$, $W_{1204}$ around a respective rotation axis 1206, 1208. The two rollers are arranged at a distance B from each other, the distance B being the distance between the rotation axes 1206, 1208 of the rollers. If the distance B between the rollers is larger than the combined maximum radius of the two rollers the rollers may be said to be arranged in a non-meshed co-operation. In a non-meshed state a ridge 1220 of a first roller 1202, is not received in an interconnecting groove 1242 of a second roller 1204. Hence, there is always a light opening between the two rollers.

Figure 7B:
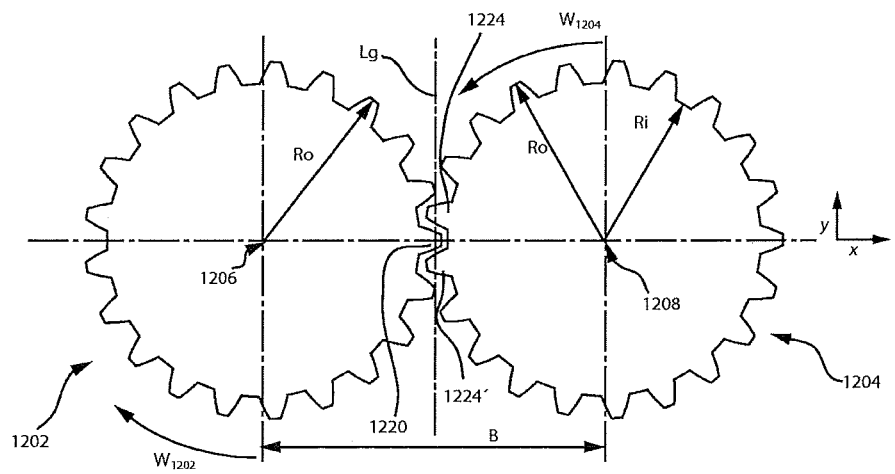

A meshed contactless co-operation is shown in FIG. 7b wherein the distance B between the two rollers is being smaller than the combined maximum radiuses of the first and the second rollers 1202, 1204. The shape of the ridge 1220, 1224, 1224' is designed so that a ridge 1220 of the first roller may be received in the interconnecting groove formed by two adjacent ridges 1224, 1224' on the second roller 1204. The meshed and contactless co-operation may be described in that a ridge 1220 of a first roller 1202 protrudes at least partly into the facing interconnecting groove 1242 of the second roller 1204. In such a container compressing arrangement there does not exist a light opening Lg, being in a y-direction. However, when recesses 126 are arranged in the ridges these may provide light openings between the rollers. The meshed and contactless co-operation may also be described as the contactless co-operation between a first gear, or cog, and a second, gear (or pinion), or second cog, wherein no contact exists between the first and second gears at a 360 degree rotation of the same. Thus the gears are arranged so that no power may be transferred through the gears.

Additionally, variations to the disclosed embodiments can be understood and effected by the skilled person in practicing the claimed invention, from a study of the drawings, the disclosure, and the appended claims. For instance one roller may be made having a larger or smaller diameter. In such a case the number of ridges arranged on said one roller may be adjusted so that the roller is operable with the co-operating roller.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A container compressing arrangement, mountable in a reverse vending machine, for compacting empty containers, said container compressing arrangement comprising:
a first and a second rotatable roller, each of said rollers having a working surface arranged between two oppositely arranged ends, wherein said rollers are arranged adjacent to each other to rotate in opposite directions around a respective rotation axis in a common geometrical xz-plane;
wherein said working surfaces comprise a plurality of ridges extending across said working surface, in an axial direction of said rollers, and distributed in the circumferential direction of said working surfaces, each ridge having a longitudinal extension in said axial direction;

wherein said ridges each comprise a leading surface, a trailing surface and a leading edge for gripping said containers, wherein said leading edge is arranged between said leading surface and said trailing surface, wherein said leading surface forms an angle, $\alpha$, in the direction of rotation of said rollers and in relation to a radial direction of said rollers such that the leading surface comprises an overhang, wherein at least one of said ridges of at least one of said rollers is provided with recesses extending in the axial direction, and wherein the recesses form a clearance between the rollers along a direction parallel to a center-to-center direction between said rotation axes;

wherein said rollers are adapted to rotate in a meshed and contactless co-operation such that a roller gap is always present between said rollers along the center-to-center direction between said rotation axes; and wherein said roller gap is, during rotation, defined by:
said leading edge of a ridge on said first roller and a trailing surface on said second roller; and
said leading edge of a ridge on said second roller and a trailing surface on said first roller.

2. The container compressing arrangement according to claim 1, wherein the smallest distance between the rollers is said roller gap, said roller gap being in an xy-plane and having the longitudinal extension in said axial direction.

3. The container compressing arrangement according to claim 1, wherein said ridges comprise recesses distributed along said axial direction of said ridges, said recesses having a maximum depth being in the range of 1 mm to 10 mm.

4. The container compressing arrangement according to claim 3, wherein a center-to-center distance between two adjacent recesses is between 1% and 50% of a length L of said working surface.

5. The container compressing arrangement according to claim 1, wherein said leading surface connects with said trailing surface of the adjacent ridge, via a radius in the range of greater than 0 mm to at most 5 mm.

6. The container compressing arrangement according to claim 1, wherein said ridges further comprise an interconnecting surface, said interconnecting surface interconnecting said leading and trailing surfaces.

7. The container compressing arrangement according to claim 6, wherein said trailing surfaces form an exterior angle to said interconnecting surface, and wherein said exterior angle is in the range of 190 degrees to 260 degrees.

8. The container compressing arrangement according to claim 6, wherein said trailing surfaces have a width being a multiple of the width of the interconnecting surface, said multiple being in the range of 1 to 20.

9. The container compressing arrangement according to claim 6, wherein said interconnecting surfaces, and/or said leading surfaces, and/or said trailing surfaces have a width in the range of 0.5 mm to 10 mm.

10. The container compressing arrangement according to claim 1, wherein said radial direction of said rollers intersects a maximum radius of said roller.

11. The container compressing arrangement according to claim 1, wherein said rollers have a maximum radius and a smallest radius, and wherein said ridges have a height, defined as the difference between said maximum and said smallest radius, said height being in the range of 2 mm to 20 mm.

12. The container compressing arrangement according to claim 1, wherein each roller comprises 3 to 20 ridges in an xy cross section of said roller.

13. The container compressing arrangement according to claim 1, wherein said roller gap is in the range of 0.5 mm to 10 mm.

14. The container compressing arrangement according to claim 1, wherein the maximum diameter of each roller is in the range of 50 mm and 100 mm.

15. The container compressing arrangement according to claim 1, wherein said working surface has a maximum length, in a direction parallel to said respective rotation axes, in the range of 50 mm to 750 mm.

16. The container compressing arrangement according to claim 1, wherein by rotating one of said rollers around said rotation axis, the width of said roller gap is adjusted.

17. A reverse vending machine comprising the container compressing arrangement according to claim 1.

18. The container compressing arrangement according to claim 1, wherein said angle, $\alpha$, is at maximum +20 degrees.

19. The container compressing arrangement according to claim 1, wherein the recesses are arranged such that at least one recess is arranged per 50 mm section length of the working surface of the roller, in the axial direction of said roller.

20. The container compressing arrangement according to claim 1, wherein the intermediate spacing between two recesses is in the range of 10 mm to 50 mm.

21. The container compressing arrangement according to claim 1, wherein said roller gap is, during rotation, defined by:
said leading edge of a ridge on said first roller and a trailing surface on said second roller;
a trailing surface on said first roller and a trailing surface on said second roller; and
said leading edge of a ridge on said second roller and a trailing surface on said first roller.

22. A method of operating a container compressing arrangement, for compacting empty containers, said container compressing arrangement comprising:
a first and a second rotatable roller, each of said rollers having a working surface arranged between two oppositely arranged ends, wherein said rollers are arranged adjacent to each other to rotate in opposite directions around a respective rotation axis in a common geometrical xz-plane (xz); and
wherein said working surface comprises a plurality of ridges extending across said working surface, in an axial direction of said roller, and distributed in the circumferential direction of said working surface, each ridge having a longitudinal extension in said axial direction;
wherein said ridges each comprise a leading surface, a trailing surface and a leading edge for gripping said containers, wherein said leading edge is arranged between said leading surface and said trailing surface, wherein said leading surface forms an angle, $\alpha$, in the direction of rotation of said rollers and in relation to a radial direction of said rollers such that the leading surface comprises an overhang, wherein at least one of said ridges of at least one of said rollers is provided with recesses extending in the axial direction, and
said method comprising:
rotating said rollers such that said rollers co-operate in a meshed and contactless arrangement, wherein a roller gap is always present between said rollers in a xy-plane,
wherein said roller gap is, during rotation, defined by:
said leading edge of a ridge on said first roller and a trailing surface on said second roller; and said leading edge of a ridge on said second roller and a trailing surface on said first roller.

23. The method according to claim 22, wherein said roller gap is, during rotation, defined by:
   said leading edge of a ridge on said first roller and a trailing surface on said second roller;
   a trailing surface on said first roller and a trailing surface on said second roller; and
   said leading edge of a ridge on said second roller and a trailing surface on said first roller.

24. A container compressing arrangement, mountable in a reverse vending machine, for compacting empty containers, said container compressing arrangement comprising:
   a first and a second rotatable roller, each of said rollers having a working surface arranged between two oppositely arranged ends, wherein said rollers are arranged adjacent to each other to rotate in opposite directions around a respective rotation axis in a common geometrical xz-plane;
   wherein said working surfaces comprise a plurality of ridges extending across said working surface, in an axial direction of said rollers, and distributed in the circumferential direction of said working surfaces, each ridge having a longitudinal extension in said axial direction;
   wherein said ridges each comprise a leading surface, a trailing surface and a leading edge for gripping said containers, wherein said leading edge is arranged between said leading surface and said trailing surface, wherein said leading surface forms an angle, $\alpha$, in the direction of rotation of said rollers and in relation to a radial direction of said rollers such that the leading surface comprises an overhang, wherein at least one of said ridges of at least one of said rollers is provided with recesses extending in the axial direction, and wherein the recesses form a clearance between the rollers along a direction parallel to a center-to-center direction between said rotation axes; and
   wherein said rollers are adapted to rotate in a meshed and contactless co-operation such that a roller gap is always present between said rollers along the center-to-center direction between said rotation axes, and wherein said roller gap extends along the entire axial direction of said rollers.

25. A method of operating a container compressing arrangement, for compacting empty containers, said container compressing arrangement comprising:
   a first and a second rotatable roller, each of said rollers having a working surface arranged between two oppositely arranged ends, wherein said rollers are arranged adjacent to each other to rotate in opposite directions around a respective rotation axis in a common geometrical xz-plane (xz); and
   wherein said working surface comprises a plurality of ridges extending across said working surface, in an axial direction of said roller, and distributed in the circumferential direction of said working surface, each ridge having a longitudinal extension in said axial direction;
   wherein said ridges each comprise a leading surface, a trailing surface and a leading edge for gripping said containers, wherein said leading edge is arranged between said leading surface and said trailing surface, wherein said leading surface forms an angle, $\alpha$, in the direction of rotation of said rollers and in relation to a radial direction of said rollers such that the leading surface comprises an overhang, wherein at least one of said ridges of at least one of said rollers is provided with recesses extending in the axial direction, and
   said method comprising:
   rotating said rollers such that said rollers co-operate in a meshed and contactless arrangement, wherein a roller gap is always present between said rollers in a xy-plane, and wherein said roller gap extends along the entire axial direction of said rollers.

* * * * *